E. P. TURNER.
CORN CUTTER.
APPLICATION FILED MAR. 26, 1914.
1,127,548.
Patented Feb. 9, 1915.
2 SHEETS—SHEET 2.
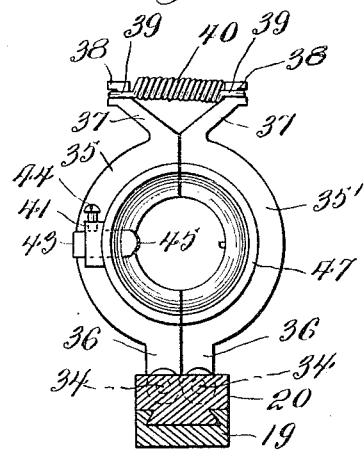
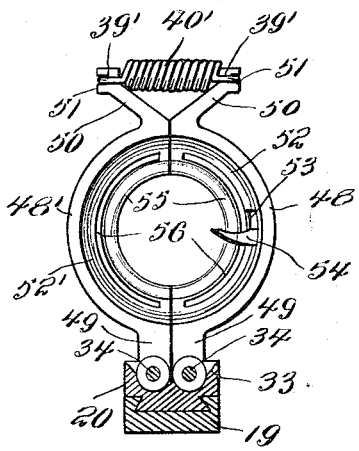
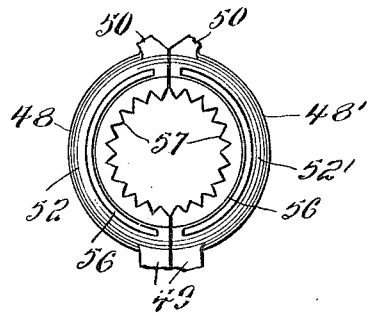
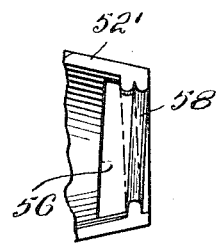
Inventor
E. P. Turner
By Victor J. Evans
Attorney
Witnesses

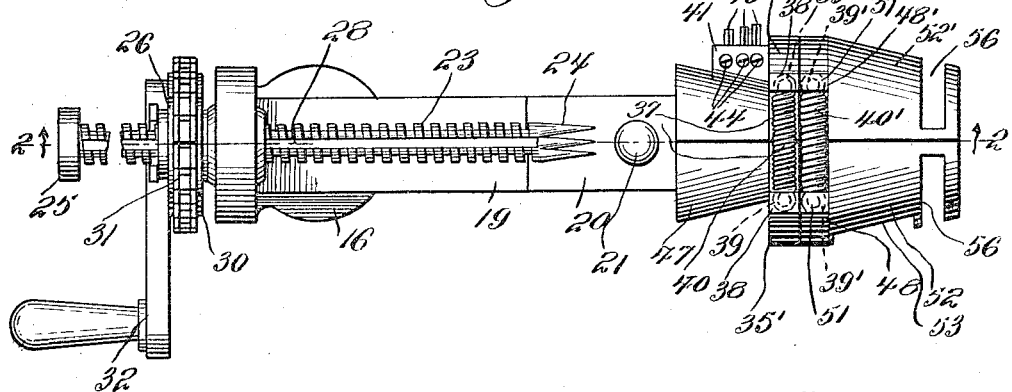

UNITED STATES PATENT OFFICE.

EDWARD P. TURNER, OF PHILADELPHIA, PENNSYLVANIA.

CORN-CUTTER.

1,127,548.      Specification of Letters Patent.      Patented Feb. 9, 1915.

Application filed March 26, 1914. Serial No. 827,414.

*To all whom it may concern:*

Be it known that I, EDWARD P. TURNER, a citizen of the United States, residing at Philadelphia, in the county of Philadelphia and State of Pennsylvania, have invented new and useful Improvements in Corn-Cutters, of which the following is a specification.

This invention relates to corn cutters of that class which are used for cutting green corn off the cob either before or after cooking.

The invention has for its object to produce a kitchen utensil of simple and efficient construction for the purpose named.

A further object of the invention is to produce a simple and efficient device which will readily adapt itself to ears of corn of various sizes.

A further object of the invention is to produce a simple and efficient utensil which will score or cut the corn, remove it from the cob and finally scrape the cob to thoroughly remove the valuable parts.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a longitudinal vertical sectional view taken on the line 2—2 in Fig. 1. Fig. 3 is a vertical sectional view taken on the line 3—3 in Fig. 2. Fig. 4 is a vertical transverse sectional view taken on the line 4—4 in Fig. 2. Fig. 5 is a sectional detail view taken on the line 5—5 in Fig. 2. Fig. 6 is a sectional detail view showing a modified form of the cutters. Fig. 7 is a detail view illustrating a modified form of scraper. Fig. 8 is a detail view illustrating still another modification in the form of the scraper. Fig. 9 is a sectional detail view taken on the line of junction of the pivoted members 48, 48' shown in Fig. 4.

Corresponding parts in the several figures are denoted by like characters of reference.

A frame is provided including an upright 15 having at its lower end a clamp comprising brackets 16, 17, the latter equipped with a clamp screw 18 whereby the frame may be mounted in position for operation. The upright is provided with a laterally extending arm or shaft 19 on which an extension arm or bracket 20 is adjustably secured by means of a bolt 21 and thumb nut 22. Threaded through the upright 15 near the upper end of the latter is a screw 23 provided at one end with prongs 24 on which an ear of corn may be mounted. The other end of the screw, which may also be referred to as the outer end, is provided with a button or stop member 25. Slidably engaging the screw 23 is a sprocket wheel 26 having a key or spline 27 engaging a longitudinal slot 28 in the screw which latter, by rotation of the sprocket, will be moved lengthwise with respect to the upright 15, movement in one direction being limited by the stop member 25. A stud 29 on the frame affords a bearing for a sprocket wheel 30 which is connected with a sprocket wheel 26 by means of a chain 31; the sprocket wheel 30 has a crank or handle 32, whereby it may be rotated for the purpose of actuating the sprocket wheel 26 and the screw.

The adjustable arm or bracket 20 is provided with a recess 33 wherein the corn engaging elements are pivotally mounted on pins 34.

35, 35' are semi-circular clamps, each having a downwardly extending arm 36 which is rounded at its lower end and apertured for the reception of one of the pins or pivot members 34, said semi-circular clamps being supported adjacent to each other, as shown. Said semi-circular clamps are provided at their upper ends with diverging arms 37 having notched or hook-shaped terminals 38 to receive loops 39 formed at the ends of a coiled spring 40, whereby the meeting faces of the clamps are normally held in contact with each other. The clamp member 35 is provided intermediate its upper and lower ends with a laterally extending lug or bushing 41 which is pierced by a plurality of obliquely disposed slots 42 wherein cutting blades 43 are adjustably mounted by securing means, such as set screws 44. The inner extremities of the blades 43 may have rounded cutting edges, as shown at 45, or they may be provided with rotary cutters, as indicated at 46, in Fig. 6 of the drawings, or any well known and convenient form of cutter may be used. The clamp members 35 and 35' carry guide members 47 combining to form a cone-shaped funnel or inlet 47 through which the ear of corn will be guided.

Additional corn engaging elements are provided in the nature of clamp members 48, 48' of semi-circular shape, said clamp members having downwardly extending arms 49 rounded at their lower ends and apertured for the passage of the pivot members 34. At their upper ends the clamp members have outwardly divergent arms 50 with terminal notches or hooks 51 for engagement with loops 39' formed at the ends of a coiled spring 40' whereby the meeting faces of the clamp members 48, 48' are normally forced in the direction of each other.

The clamp members 48, 48' support casing members 52, 52' which together form a cone-shaped funnel for the passage of the ear of corn. The casing member 52 has a horizontal slot 53 adjacent to the lower edge of which are fixed a plurality of teeth 54 combining to form a comb, the function of which is to scrape and remove the kernels that have been cut and loosened on the cob by the action of the cutting members previously referred to, the meaty kernels and juices being guided through the slot 53 to a suitable receptacle placed beneath. The casing members 52, 52' taper or converge rearwardly and are provided adjacent to their rear ends with semi-circular scraping members 55 adjacent to which slots 56 are formed in order to enable the material removed from the cob by the scrapers to pass out and into the receptacle. The scraping members 55 may consist of plain or semi-circular flange members; said members, however, may be serrated, as seen in Fig. 7, where they are designated by the numeral 57; or the scraping members on the two casing members may combine to form a spiral coil, as seen in Fig. 8, where said scraping members are designated by 58.

From the foregoing description, taken in connection with the drawings hereto annexed, the operation and advantages of this invention will be readily understood. The sliding arm or bracket 20 carrying the corn engaging elements is first set to a proper position according to the average length of the ears of corn that are to be operated upon. By manipulating the crank 32 the screw 23 may be retracted, after which the ear of corn is impaled on the prongs 24. The rotation of the crank is now reversed, thus projecting the screw carrying the ear of corn in the direction of the clamp members 35, 35' carrying the cutting members 43 and the guide member 47. The cutting members are set at the same angle as the threads on the screw 23, but they are irregularly disposed as to the spaces between said cutting members so that one will not follow in the path or track of the others. It is obvious that by loosening the set screws 44 the cutting members may be moved toward or from the axis about which the ear of corn is revolved, according to the diameter of the ear. The blades or cutting members will score or cut the kernels which presently will pass into engagement with the teeth 54 on the casing member 52, being thereby detached from the cob and permitted to pass through the slot 53. Finally the cob passes the scraper members 55, (or 57 or 58, as the case may be) the cob being thereby scraped clean and the detached particles passing through the slots 56. When the cob has been fully projected between the casing members 52, 52', the latter will become retracted by the action of the springs 40' so that, when the rotation of the screw 23 is reversed, the scrape members 55 will obstruct the butt end of the cob and cause the latter to become discharged from the screw prongs.

Having thus described the invention, what is claimed as new, is:—

1. In a device of the class described, a frame, a cob engaging screw threaded therethrough and having a longitudinal slot, a sprocket slidable on the screw and having a key engaging the slot, and means for rotating the sprocket.

2. In a device of the class described, a frame member, a screw threaded therethrough, said screw having prongs at one end and a longitudinal slot, a sprocket slidable on the screw and having a key engaging the slot, a stop member on the screw to limit its movement in one direction, and operating means including a second sprocket supported for rotation and having an operating crank and a chain trained over the two sprockets.

3. In a device of the class described, an upright frame member having a lateral arm, an extension bracket supported for longitudinal adjustment on the lateral arm, a cob carrying screw threaded through the upright frame member, corn engaging elements mounted on the extension bracket, and means for actuating the screw.

4. In a device of the class described, a frame including an upright, a screw threaded therethrough and having terminal prongs, means for actuating the screw, and corn engaging elements supported in advance of the screw and including pivotally supported semi-circular members, guide members associated therewith and combining to form an inlet funnel, cutting members carried by one of the semi-circular members, and means for resiliently forcing the semi-circular members in the direction of each other.

5. In a device of the class described, a pair of resiliently supported spring actuated clamp members, guides on said clamp members combining to form an inlet funnel, a lateral boss on the other clamp member, said boss having inclined slots, cutting members adjustable in said slots, and means for rotating and projecting an ear of corn between the clamp members.

6. In a device of the class described, the combination of ear rotating and projecting means, cutting means, pivoted spring actuated clamp members having casing members between which the ear is projected subsequent to being cut, one of said casing members being provided with a slot, and teeth fixed adjacent to said slot and constituting a corn detaching comb.

7. In a device of the class described, ear rotating and projecting means, and kernel cutting means, in combination with resiliently supported casing members having slots, and grain detaching and cob scraping means adjacent to the slots.

8. In a device of the class described, a pair of pivotally supported spring actuated clamp members, casing members carried thereby, said casing members combining to form a cone-shaped funnel, and said casing members having slots adjacent to the ends thereof, and arcuate scraping means adjacent to the ends and to said slots.

In testimony whereof I affix my signature in presence of two witnesses.

EDWARD P. TURNER.

Witnesses:
H. L. TOURNY,
C. J. KOHLEN.

Copies of this patent may be obtained for five cents each, by addressing the "Commissioner of Patents, Washington, D. C."